US005213873A

United States Patent [19]

Yasuda et al.

[11] Patent Number: 5,213,873

[45] Date of Patent: May 25, 1993

[54] AQUEOUS INK-JET RECORDING SHEET

[75] Inventors: Kenji Yasuda; Kazuaki Ohshima; Susumu Hasegawa, all of Tokyo, Japan

[73] Assignee: Oji Paper Co., Ltd., Tokyo, Japan

[21] Appl. No.: 600,378

[22] Filed: Oct. 19, 1990

[30] Foreign Application Priority Data

Oct. 20, 1989 [JP] Japan ..................... 1-271464
Dec. 28, 1989 [JP] Japan ..................... 1-338272

[51] Int. Cl.[5] ..................... B32B 9/00
[52] U.S. Cl. ..................... 428/195; 428/211; 428/913; 428/914; 428/331
[58] Field of Search ..................... 428/211, 195, 327.5, 428/913, 914, 327

[56] References Cited

U.S. PATENT DOCUMENTS 4,564,560 1/1986 Tani et al. ..................... 428/411.1
4,792,487 12/1988 Schubring et al. ..................... 428/211
4,900,620 2/1990 Tokita et al. ..................... 428/330

FOREIGN PATENT DOCUMENTS 63-49478 3/1988 Japan .

OTHER PUBLICATIONS

Britt, K. W., In K. W. Britt., ed., Handbook of Pulp & Paper Tech. Van Nostrand Reinhold Co., New York, 1970 pp. 666–668.

Carlton, A. W. In K. W. Britt ed., Handbook of Pulp & Paper Tech. Van Nostrand Reinhold Co., New York, 1970, pp. 710–711.

Patent Abstracts of Japan, vol. 12, No. 267 (M-722) [3114] Date: Jul. 26, 1988.

*Primary Examiner*—Patrick J. Ryan
*Assistant Examiner*—W. Krynski
*Attorney, Agent, or Firm*—Armstrong, Westerman, Hattori, McLeland & Naughton

[57] ABSTRACT

An aqueous ink-jet recording sheet capable of recording clear, brilliant color images, and having a high water resistance, storage durability and resistance to curling and undulations, comprises a neutral paper substrate sheet having a Stoechigt sizing degree of 1 to 15 seconds; and an aqueous ink image-receiving layer in a basis weight of 0.5 to 10 $g/m^2$ and comprising (a) fine, oil absorbing silica particles, (b) polyvinyl alcohol binder and (c) a water resisting agent comprising a cationic, water-soluble acrylic copolymer having side chains attached to a vinyl backbone chain and each having at least two cationic radicals.

3 Claims, No Drawings

AQUEOUS INK-JET RECORDING SHEET

BACKGROUND OF THE INVENTION

1) Field of the Invention

The present invention relates to an aqueous ink-jet recording sheet. More particularly, the present invention relates to an aqueous ink-jet recording sheet capable of recording thereon images or letters in a brilliant color and in the form of a clear and exact dot, having an excellent water resistance, storage durability, dimensional stability, and easy handling property, and providing a satisfactory appearance even after a printing operation.

2) Description of the Related Arts

It is known that a recording sheet for forming a hard copy having a high quality, in accordance with an ink-jet recording method, is provided by coating a surface of a substrate sheet, for example, a paper sheet, with a coating composition comprising a pigment and a resinous binder, to form a coating layer which allows small drops of an aqueous ink jetted on the surface of the coating layer to rapidly penetrate the coating layer, at a right angle to the surface of the coating layer, to form clear images consisting of a number of dots on the coating layer surface.

Recent developments of the ink-jet recording system using an aqueous ink have enhanced the various performances of the printer, especially the printing speed, resolving power of the image formed and color-brightness, and thus the recording sheet for the ink-jet recording system must have a greatly improved ink-absorbing speed, ink-absorbing capability, and allow a regular penetration of the ink.

For example, Japanese Unexamined Patent Publication No. 62-158084 discloses a method of producing an ink-jet recording material in which specific fine synthetic silica particles are contained in a coating layer. From this Japanese publication, it is known that the specific fine silica particles exhibit a high ink-absorbing speed, a large ink-absorbing amount, a small spread of absorbed ink, a circular-shaped ink-dot, and no influence on the color development of the ink, and thus are excellent as an ink-absorbing agent for the ink-jet recording sheet.

The coating layer comprising the above-mentioned specific fine silica particles is disadvantageous in that, when the aqueous ink is absorbed in the coating layer, a coloring material in the aqueous ink deeply penetrates, together with an aqueous medium in which the coloring material is dissolved or dispersed, the coating layer, and thus the resultant images on the coating layer surface exhibit an unsatisfactory optical density and brightness. Accordingly, to form clear and bright color images on the coating layer surface, the coloring material in the ink must be maintained in the surface portion of the coating layer and only the aqueous medium of the ink allowed to be absorbed by the entire coating layer.

The ink-jet recording sheet can be easily printed in the same way as usual paper sheets, and thus the ink-jet recording sheet is expected to be widely utilized in various fields in which conventional fine paper sheets and coated paper sheets are used. Accordingly, the ink-jet recording sheet must provide not only an appearance similar to a conventional fine paper sheet or coated paper sheet but also an excellent aptitude for practical utilization.

For example, the ink-jet recording sheet must meet the requirements of a satisfactory writing ability with a ball-point pen or pencil, a required touch and slippage, a low friction between recording sheets, and an easy handling when supplied as a paper roll or cut paper sheets to a printer.

It is known that a conventional ink-jet recording sheet having a coating layer in an amount of 10 $g/m^2$ or more and comprising, as a principal component, fine silica particles, is disadvantageous in that it is difficult to write thereon with a ball-point pen or pencil, the touch is not satisfactory, the slippage is poor or too high, the friction between the paper sheets is too high or too low, and the feed and delivery of the sheets in the printer is difficult.

Also, when aqueous ink images are formed on a coating layer comprising the fine synthetic silica particles, the aqueous ink is fixed on and within the coating layer. The aqueous ink and the synthetic silica particles and other component of the coating layer are hydrophilic, and thus the ink images on the coating layer have a poor water resistance.

To enhance the water resistance of the ink images on the ink-jet recording sheet, it has been recently attempted to add a cationic surface-active agent and/or a cationic, water-soluble polymer to the coating layer. It is already known that color images formed by a water-soluble dye can be fixed with the cationic surface-active agent or cationic water-soluble polymer, and that the fixed color images exhibit an enhanced water resistance.

For example, many attempts have been made to contain in the coating layer for receiving ink images a water resisting agent consisting of a polycationic electrolytic polymer, for example, polyvinyl pyridium bromide or polyethylene imine, as disclosed in Japanese Unexamined Patent Publication No. 56-84992, dimethyldiallyl ammonium chloride as disclosed in Japanese Unexamined Patent Publication No. 59-20696, polyethylene imine-organic acid salts as disclosed in Japanese Unexamined Patent Publication No. 59-198186, polyalkylene polyamine dicyandiamide ammonium salt-condensation products as disclosed in Japanese Unexamined Patent Publication No. 60-49990, or polyethyleneimine-quaternary ammonium compounds as disclosed in Japanese Unexamined Patent Publication No. 60-76386.

The images comprising an ink and formed on a coating layer comprising a pigment, a binder and other additives show an improved water resistance thereof when the above-mentioned cationic compounds are added to the coating layer, but the effect of the conventional cationic compound on the enhancement of the water resistance is not satisfactory, and the addition of the conventional cationic compounds additionally causes a lowering of the storage durability of the ink images.

Further, attempts have been made to improve the ink-absorption of the ink-jet recording sheet. For example, Japanese Examined Patent Publication No. 60-27588 discloses an ink-jet recording sheet composed of a non-sized paper sheet or a coated paper sheet in which a substantially non-sized paper sheet is coated with an absorbing layer of silica. Also, Japanese Examined Patent Publication No. 63-65037 discloses an ink-jet recording sheet having an enhanced color image-forming property and composed of a non-water-absorbing substrate sheet, for example, a highly sized paper sheet or a plastic film, and a high water-absorbing coating layer comprising, as a principal component, silica particles.

Among the above-mentioned various types of conventional ink-jet recording sheets, the ink-jet recording sheet having a water-absorbing substrate sheet is considered superior, in view of the balance of the cost with the touch and required properties. This type of recording sheet must have a high ink-absorbing property such that the ink is rapidly absorbed into the inside of the substrate sheet and the resultant ink images received on the recording sheet appear to be dry, and a high resistance to the tendency of curling and cockling. Generally, since the tendency of curling and cockling is increased with an increase in the ink absorption of the recording sheet, the requirement for an enhancing of the ink-absorption of the recording sheet is contradictory to the requirement for preventing the tendency of curling and cockling. For example, where the ink-absorbing speed of the recording sheet is enhanced by using a low sized paper sheet as a substrate sheet, the resultant recording sheet allows the ink to rapidly and deeply penetrate into the substrate sheet, and thus curling and undulations are easily formed in the recording sheet.

To eliminate the above-mentioned disadvantages, an ink-absorbing coating layer is formed on a highly-sized substrate paper sheet. In this recording sheet, the ink is rapidly absorbed in the coating layer and the penetration of the ink in the substrate sheet is restricted. Nevertheless, when the ink is absorbed in a large amount in excess of the upper limit of the ink-absorbing capacity of the coating layer, an undesirable bleeding of the absorbed ink occurs. Also, the above-mentioned absorption of ink in the coating layer results in a generation of curling or corrugations in the recording sheet. Further, this type of recording sheet is accompanied with an increased cost.

Japanese Examined Patent Publication No. 63-52588 discloses an ink-jet recording sheet comprising a paper sheet in which glass fibers and a large amount of water-absorbing pigment are mixed with a cellulose pulp, to lower the bonding strength of the cellulose pulp fibers to each other and to prevent the formation of curling and corrugations in the paper sheet when the ink is absorbed.

Nevertheless, the addition of glass fibers makes the handling of the resultant sheet difficult and causes a lowering of the mechanical strength of the resultant sheet, and thus the practical utility of the resultant recording sheet is doubtful.

Conventional paper sheets having a high dimensional stability even when the moisture content of the sheets and the humidity of the ambient atmosphere are fluctuated are known, and are utilized as paper sheets for optical character reader or NIP (non-impact printing) paper sheets.

Nevertheless, it is not conventionally known how to prevent the formation of curling and cockling on the ink-jet recording sheets, and thus ink-jet recording sheets free from the creation of curling and cockling therein are not produced.

SUMMARY OF THE INVENTION

An object of the present invention is to provide an aqueous ink-jet recording sheet capable of absorbing an aqueous ink at a high speed and in a large amount, and of forming ink images thereon at a high speed and at a high resolving power, without creating curling, undulations or waving therein.

Another object of the present invention is to provide an aqueous ink-jet recording sheet capable of forming ink images having a high water resistance and storage durability without curling and undulations, and having an easy handling property.

The above-mentioned objects can be attained by the aqueous ink-jet recording sheet of the present invention which comprises a substrate sheet consisting of a neutral paper sheet having a Stoechigt sizing degree of from 1 second to 15 seconds; and an aqueous ink image-receiving layer in an amount of 0.5 to 10 $g/m^2$, formed on a surface of the substrate sheet and comprising (a) fine silica particles having an oil absorption of 150 ml/100 g or more, (b) a binder consisting of at least one member selected from polyvinyl alcohol resins and derivatives thereof, and (c) a cationic polymeric material comprising at least one cationic, water-soluble acrylic copolymer having side chains each having at least two cationic radicals.

DESCRIPTION OF THE PREFERRED EMBODIMENTS

The aqueous ink-jet recording sheet of the present invention comprises a substrate sheet and an aqueous ink image-receiving layer.

The substrate sheet is composed of a neutral paper sheet having a Stoechigt sizing degree of from 1 to 15 seconds, preferably 2 to 10 seconds.

When the Stoechigt sizing degree of the neutral paper sheet for the substrate sheet is less than 1 second, the resultant recording sheet is disadvantageous in that the ink absorbed by the recording sheet easily penetrates through the substrate sheet and oozes out of the sheet, the ink images received by the recording sheet are irregularly spread through the substrate sheet, and the resultant ink images on the recording sheet have a reduced water resistance.

When the Stoechigt sizing degree of the neutral paper sheet is more than 15 seconds, the resultant recording sheet exhibits an unsatisfactory ink-absorbing property, and thus it becomes necessary to increase the amount of the ink-image receiving layer on the substrate sheet to more than 10 $g/m^2$. The neutral paper sheet for the substrate sheet preferably comprises, as a principal component, a cellulose pulp, for example, hard wood pulp, soft wood pulp, or a mixture of hard and soft wood pulps. The neutral paper sheet optionally contains, as an additional component, at least one member selected from synthetic fibers, for example, polyvinylalcohol fibers and polyester fibers, and synthetic pulps, for example, polyetylene pulp, in a small amount, for example, 20% or less based on the weight of the neutral paper sheet.

The neutral paper sheet usually contains, as an additive, a precipitated calcium carbonate, which effectively improves the ink-absorbing property of the paper sheet, in an amount of about 30% by weight.

Preferably, the substrate sheet has a basis weight of 20 to 100 $g/m^2$ and a thickness of 10 to 200 $\mu m$.

Also, the neutral paper sheet usually has a pH of about 4 to about 8. When the pH is less than about 4, the resultant recording sheet is sometimes discolored after a long term storage. Also, if the pH is more than about 8, the resultant recording sheet exhibits a reduced water resistance and storage durability of ink image formed thereon.

In the recording sheet of the present invention, the aqueous ink image-receiving layer is in an amount of 0.5 to 10 $g/m^2$ and comprises (a) fine silica particle having an oil absorption of 150 ml/100 g or more determined in accordance with JIS K5101-1969, (b) a binder consisting of at least one member selected from the group consisting of polyvinyl alcohol resins and derivative thereof, for example, silanol-modified polyvinyl alcohol resins, and (c) a cationic polymeric material comprising at least one cationic, water-soluble acrylic copolymer having side chains each having at least two cationic radicals.

Preferably, in the image-receiving layer, the content of the fine silica particles is 40% to 80% by weight, the content of the binder is 15 to 40% by weight, and the content of the cationic polymeric material is 5 to 20% by weight.

The cationic polymeric material usable for the present invention preferably comprises at least one cationic, water-soluble acrylic copolymer having recurring units of the formula (I):

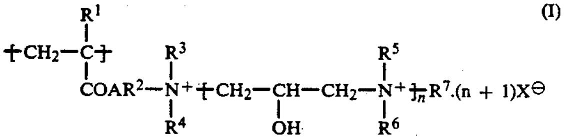
(I)

wherein $R_1$ represents a member selected from the group consisting of a hydrogen atom and a methyl radical; A represents a divalent radical selected from the group consisting of —O— and —NH—; $R_2$ represents a member selected from the group consisting of alkylene radicals having 2 to 4 carbon atoms and the radical of the formula:

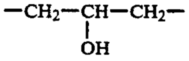

$R_3$, $R_4$, $R_5$ and $R_6$ respectively and independently from each other represents a member selected from alkyl radicals having 1 to 3 carbon atoms; $R_7$ represents a member selected from the group consisting of alkyl radicals having 1 to 18 carbon atoms and benzyl radical; and n represents an integer of 1 to 3.

The above-mentioned cationic, water-soluble acrylic copolymer is a quaternary ammonium salt type polymeric electrolytic material which effectively improves the water resistance of water-soluble dyes and is disclosed in Japanese Unexamined Patent Publication No. 63-49478.

When the specific cationic polymeric material is mixed with the fine silica particles and the polyvinyl alcohol binder, the resultant image-receiving layer exhibits not only an excellent water resistance of the ink images thereon but also a superior resolving power and color-forming property of the ink images.

The mechanisms of the above-mentioned specific function of the cationic polymeric material is not completely clear, but it is assumed that the specific cooperation of the cationic polymeric material with the fine silica particles and the polyvinyl alcohol binder will cause the above-mentioned specific effect. Particularly, it is assumed that the cationic polymeric material is combined with the surfaces of the fine silica particles, and the resultant composite substance exhibits the specific effects.

The fine silica particles usable for the present invention preferably have an oil absorption of 150 ml/100 g or more, determined in accordance with JIS K5101-19, and preferably have a specific surface area of 200 $m^2/g$ or more, more preferably 300 $m^2/g$ or more, determined by the BET method.

When the above-mentioned fine silica particles are contained in an amount of 40 to 80% by weight, ink images can be formed with a brilliant color and a high resolving power on the resultant image-receiving layer.

To improve the travelling property and the surface strength of the recording sheet, to lower the frictional coefficient of the recording sheet, and to enhance the surface slippage and ball-point pen or pencil-writing capability of the recording sheet, preferably the fine silica particle have an average secondary particle size of 10 μm or less, more preferably 4 μm or less, but not less than 1 μm. When the average secondary particle size of the fine silica particles is more than 10 μm, the resultant image-receiving layer sometimes exhibits an unsatisfactory resolving power of the ink images. Also, when the average secondary particle size of the fine silica particles is less than 1 μm, the resultant ink images on the image-receiving layer are sometimes unclear due to an insufficient color-forming of the ink.

Generally, the fine silica particles are produced by a precipitation method or gelation method, and the resultant primary particles are firmly agglomerated to form secondary particles having a number of fine pores. Usually, the silica particles are used in the form of secondary particles. The specific surface area and the radius and volume of the fine pores are variable, depending on the average diameter of the primary particles and the average density of the secondary particles. The gaps among the fine silica particles are also variable, depending on the shape and size of the secondary particles. Therefore, the image-receiving layer containing the fine silica particles have two different types of fine pores, i.e., pores formed among the silica particles and fine pores formed within the secondary particles. Such pores effectively enhance the ink-absorbing property of the resultant image-receiving layer and form brilliant color images thereon.

The oil absorption of the fine silica particles is considered to be a parameter of the aqueous ink-absorbing and holding property of the particles. The fine pores formed among the primary particles firmly fixed to each other in the secondary particles contribute to the oil absorption. In the present invention, the fine silica particles preferably have an oil absorption of 150 ml/100 g or more, but less than 400 ml/100 g, more preferably 350 ml/100 g or less, determined in accordance with JIS K5101-19.

When the oil absorption of the fine silica particles is less than 150 ml/100 g, the resultant image-receiving layer exhibits an unsatisfactory aqueous ink-absorbing speed and amount.

When the fine silica particles have a large specific surface area, for example, 200 $m^2/g$ or more, the surfaces of the silica particles located in the surface portion of the image-receiving layer can trap a large amount of a coloring material, i.e., dye, in the ink, and thus a large amount of the dye can be fixed on the surface of the image-receiving layer. Therefore, the resultant ink images on the image-receiving layer have a deep, brilliant color and are clear.

In the ink image-receiving layer of the present invention, the fine silica particles are optionally mixed with a small amount of an additional white pigment, for example, kaolin, clay, talc, zeolite, precipitated calcium carbonate, ground calcium carbonate, aluminum hydroxide, white carbon or a plastic pigment.

The binder usable for the present invention is water soluble and comprises at least one member selected from polyvinyl alcohol resins and derivatives thereof.

The polyvinyl alcohol derivatives are preferably silanol-modified polyvinyl alcohol copolymer resins as disclosed in Japanese Unexamined Patent Publication No. 58-59203. The binder optionally contains a small amount of additional natural or synthetic water-soluble polymeric material, for example, starch or starch derivative, or synthetic polymeric latex material, for example, polyvinyl acetate latex or styrene-butadiene copolymer latex.

The binder is usually contained in an amount of 15 to 40% by weight, more preferably 20 to 35% by weight, in the image-receiving layer.

In an embodiment of the ink-jet recording sheet of the present invention, the neutral paper sheet for the substrate sheet comprises, as a principal component, a cellulose pulp, and when a unit neutral paper sheet having a predetermined length or width is soaked in water and allowed to elongate without restriction, the standard deviation in the elongation of the unit sheet in the cross direction thereof is preferably 30% or less, determined at a square unit area of 1 $cm^2$ of the unit sheet.

Usually, the ink-jet recording sheet of the present invention is used in the form of cut sheets in a standard size or of a fanfolded sheet. When the recording sheet is subjected to an aqueous ink-jet printing operation, sometimes a curling or undulation of the sheet occurs due to the absorption of the aqueous ink. It was found by the inventors of the present invention that the intensity of the curling or cockling tendency depends on the fluctuation in above-mentioned elongation of the sheet in water. Especially, when a fine paper sheet, which is usually produced by a conventional Fourdrinier paper machine, is used, the curling or cockling due to the aqueous ink-absorption is periodically generated at a periodic length of several mm to several cm in the recording paper sheet.

Generally, it is difficult to prevent the above-mentioned elongation of paper sheet soaked water, and even if the elongation can be minimized, it is impossible to reduce the elongation to zero. Therefore, to eliminate the above-mentioned disadvantages derived from the uneven local elongation of the recording sheet due to water-absorption, it is important to control the fluctuation in elongation of the recording sheet by utilizing the standard deviation in elongation.

It was found by the inventors of the present invention that the generation of curling or undulations in the paper sheet clearly depends on the standard deviation in elongation of the sheet in water, rather than on the absolute value of the elongation.

Further, it was found that, when a unit neutral paper sheet having a predetermined length or width and comprising, as a principal component, a cellulose pulp, is soaked in water and allowed to elongate without restriction, and the standard deviation in elongation of the unit sheet in cross direction thereof (which direction is at a right angle to the machine direction of the sheet in the conventional paper machine), is preferably 30% or less determined at a square unit area of 1 cm × 1 cm (the side length of which area, i.e., 1 cm, is close to the periodic length of the curling or undulations in the sheet), the generation of curling or undulations is significantly restricted.

Accordingly, the neutral paper sheet for the substrate sheet preferably has a standard deviation in elongation thereof in water of 30% or less in the transversal or cross direction thereof. Note, the standard deviation in the elongation of the paper sheet in water can be reduced by a relaxation of stress.

In another embodiment of the aqueous ink-jet recording sheet of the present invention, the neutral paper sheet for the substrate sheet comprises, as a principal component, a cellulose pulp, and when soaked in water and allowed to elongate without restriction, the neutral paper sheet has a ratio of the elongation in the machine direction to the elongation in the cross direction, of 1.3:1 or less.

The formation of curls and cockles in the recording sheet when printed with the aqueous ink can be prevented not only by reducing the absolute value of the above-mentioned elongation of the sheet but also by lowering the ratio of the elongation in the machine direction, to that in the cross direction.

In consideration of the appearance of the resultant paper sheet, the ratio of the elongation of the paper sheet in the machine direction to that in the cross direction is preferably 1.3:1 or less, more preferably 1 15:1 or less. This type of neutral paper sheet is suitable for providing an aqueous ink-jet recording sheet capable of receiving clear ink images at a high ink-absorbing speed, without forming the undesirable curls and cockles.

In still another embodiment of the recording sheet of the present invention, the neutral paper sheet for the substrate sheet comprises, as a principal component, a cellulose pulp, and is conditioned by drying the sheet to a moisture content of 6% by weight or less, and then moistening the sheet under a tension to an extent such that the increase in moisture content of the sheet is at least 1% by weight.

It was found that, when an aqueous ink-jet recording sheet was prepared by producing a neutral paper sheet by using the conventional paper machine with a plurality of cylinders and coating a surface of the resultant dried paper sheet with a ink image-receiving layer, and the sheet was immediately subjected to an aqueous ink-jet printing operation, the printed sheet exhibited significant curling or cockling.

Also, it was found that, when an aqueous ink-jet recording sheet was prepared in the above-mentioned manner, moistened after drying the sheet, wound up under a tension, stored in the roll form for a certain period to release the remaining stress in the paper sheet, to improve the appearance of the resultant sheet, and then subjected to the same ink-jet printing operation as mentioned above, the curling and undulations formed in the printed sheet were smaller than those mentioned above.

Namely, to reduce the formation of curls and cockles, the neutral paper sheet produced by the conventional paper machine is preferably dried to a moisture content of 6% by weight or less, more preferably from 3% to 6% by weight, and then moistened to an increase in moisture content of 1% by weight or more, more preferably from 2% to 4% by weight, under a tension, preferably of 50 to 300 g/cm.

EXAMPLES

The present invention will be further illustrated by way of the following examples.

Example 1

1) Production of a neutral paper sheet for substrate sheet

A pulp slurry was prepared by suspending 20 parts by weight of precipitated calcium carbonate (available under the trademark of Precipitated Calcium Carbonate PC, from Shiraishi Kogyo K.K.), 100 parts by weight of bleached hard wood kraft pulp having a brightness of 91%, 1 part by weight of cationic starch, 0.05 part by weight of a neutral sizing agent (available under the trademark of Fibran 81, from Oji National Co.) and 1.5 parts by weight of alum.

A wet neutral paper sheet was formed from the pulp slurry by using the conventional paper machine with a plurality of cylinders and dried from a water content of 75% by weight to a moisture content of 5% by weight. The resultant dried paper sheet had a basis weight of 75 $g/m^2$, a Bekk smoothness of 53 seconds of the felt side surface (front surface), a Bekk smoothness of seconds of the wire side surface (back surface), a lightness of 92%, an ash content of 15.0% in terms of calcium carbonate, a Stoechigt sizing degree of 5 seconds, and a pH of 6.5.

Also, when soaked in water the paper sheet had an elongation of 2.0% in the cross direction, and a standard deviation in elongation in water in the cross direction of 18% determined at a square unit area of 1 cm × 1 cm at room temperature.

2) Preparation of cationic polymeric material

A cationic, water-soluble acrylic copolymer was prepared in the following manner.

A one liter flask equipped with a stirrer, a thermometer, a cooling coil and a dropping funnel was charged with a reaction mixture consisting of 200 parts by weight of N,N-dimethylaminoethylmethacrylate, 200 parts by weight of isopropyl alcohol, and 1.2 parts by weight of α,α'-azo-bis-isobutylonitrile, air in the flask was replaced by a nitrogen gas, and the reaction mixture was then subjected to a polymerization at a temperature of 80° C. for 4 hours.

The reaction mixture was then admixed with 478 parts by weight of a 50% aqueous solution of 3-chloro-2-hydroxypropyltrimethyl ammonium chloride (in an equimolar amount to N,N-dimethylaminoethylmethacrylate), and the admixture was subjected to a reaction at a temperature of 80° C. for 6 hours. Thereafter, isopropyl alcohol in the resultant mixture was distilled away, while dropping water thereon, and finally, a solution of a cationic, water-soluble acrylic copolymer in a solid content of 30% by weight was obtained.

3) Preparation of coating color paste

A coating color paste having the following composition was prepared.

| Component | Part by weight |
|---|---|
| Fine silica particles (*)1 | 100 |
| Polyvinyl alcohol (*)2 | 35 |
| Cationic, water-soluble copolymer (*)3 | 10 |
| Water | — |

-continued

Note:
(*)1 The silica particles were available under the trademark of Mizukasil P78A, from Mizusawa Kagaku K.K., and had the following properties.

| | |
|---|---|
| Oil absorption | 246 ml/100 g |
| Specific surface area | 350 $m^2/g$ |
| Average secondary particle size | 3.5 μm |

(*)2 The polyvinyl alcohol was available under the trademark of PVA 117 from Kuraray K.K.
(*)3 This copolymer was that mentioned above.

4) Production of recording sheet

The coating color paste was coated on a surface of the neutral paper sheet to form an ink image-receiving layer having a solid weight of 5 $g/m^2$, and to provide an ink-jet recording sheet.

5) Tests

The ink-jet recording sheet was subjected to the following tests.

A) Ink-jet printing aptitude test

The ink-jet recording sheet was subjected to an ink-jet printed operation by using a paint-jet printer made by Hewlett-Packard Co.

The ink-absorbing property, the brilliance of the ink images, and the shape of dots in the ink images of the recording sheet were observed and evaluated.

B) The ink-absorbing property was evaluated by measuring the time (in seconds) in which the printed ink images were dried, and was indicated in four classes.

| Class | Condition |
|---|---|
| 4 | Excellent |
| 3 | Good |
| 2 | Satisfactory |
| 1 | Unsatisfactory |

C) The brilliance of the ink images was evaluated by observing yellow, magenta and cyan ink images by the naked eye.

D) The shape of the dots was evaluated in the following four classes.

| Class | Condition |
|---|---|
| 4 | Almost a perfect circle |
| 3 | Almost circular |
| 2 | Approximately circular |
| 1 | Non-circular |

E) The water resistance was evaluated in four classes by immersing a paper sheet in water at room temperature for 24 hours, and observing the conditions of the immersed paper sheet by the naked eye.

| Class | Conditions |
|---|---|
| 4 | No change |
| 3 | Slightly faded |
| 2 | Faded but discriminatable |
| 1 | Substantially disappeared |

F) The storage durability was evaluated in four classes by exposing a paper sheet to direct sunlight for 10 days, and observing the exposed paper sheet by the naked eye.

| Class | Conditions |
|---|---|
| 4 | No change |
| 3 | Slightly faded |
| 2 | Faded but discriminatable |
| 1 | Substantially disappeared |

G) The resistance to curling and cockling was evaluated in four classes, by observing the conditions of the printed sheet by the naked eye.

| Class | Conditions |
|---|---|
| 4 | No curling and undulation |
| 3 | Very little curling and undulation |
| 2 | Little curling and undulation |
| 1 | Significant curling and undulation |

The test results are shown in Table 1.

Example 2

The same procedures as in Example 1 were carried out, with the following exceptions.

The neutral paper sheet for the substrate sheet was prepared in the following manner.

A pulp slurry was prepared by suspending 100 kg of bleached hard wood kraft pulp, 25 kg of precipitated calcium carbonate, 200 g of cationic starch, 100 g of a paper-reinforcing agent and 200 g of a sizing agent comprising an alkylketone compound in 5000 kg of water, and subjecting the slurry to the conventional paper-making process.

The resultant wet paper sheet was dried from a water content of 75% by weight to a moisture content of 5% by weight, by using a multi-cylinder type dryer, the dried paper sheet was moistened to a moisture content of 7.5%, by using a static electric moistening apparatus, and the moistened paper sheet was reeled up under a tension of 200 g/cm. The resultant conditioned fine paper sheet had a basis weight of 65 g/m$^2$, a Bekk smoothness of the felt side of 35 seconds, a Bekk smoothness of the wire side of 28 seconds, and a Stoechigt sizing degree of 5 seconds.

The test results are shown in Table 1.

Example 3

The same procedures as in Example 2 were carried out, with the following exceptions.

The sizing agent comprised an alkenylsuccinic anhydride and was used in an amount of 80 g.

The resultant conditioned fine paper sheet had a basis weight of 75 g/m$^2$, a Bekk smoothness of the felt side surface of 53 seconds, a Bekk smoothness of the wire side surface of 48 seconds, and a Stoechigt sizing degree of 12 seconds. Also, after soaking in water, the paper sheet had an elongation of 2.0% in the machine direction and 1.7% in the cross direction, and a ratio of the machine directional elongation to the cross-directional elongation in water of 1.18:1.

The test results are shown in Table 1.

Comparative Example 1

The same procedures as in Example 1 were carried out, with the following exceptions.

In the drying step by the multi-cylinder type dryer, the wet paper sheet was dried from a water content of 75% by weight to a moisture content of 8% by weight.

The dried fine paper sheet had a basis weight of 56 g/m$^2$, a Bekk smoothness of the felt side surface of 35 seconds, a Bekk smoothness of the wire side surface of 28 seconds, and a Stoechigt sizing degree of 9 seconds.

Also, the paper sheet had an elongation in water of 4.1% in the cross direction and a standard deviation in elongation in water of 47%, determined at a square unit area of 1 cm × 1 cm of the sheet.

A coating color paste for the ink image-receiving layer had the following composition.

| Component | Part by weight |
|---|---|
| Fine silica particles (Mizukasil P78A) | 100 |
| Polyvinyl alcohol (PVA 117) | 20 |
| Polyethyleneimine quart-ammonium salt (made by Nihon Shokubai Kagaku K.K.) | 10 |

The ink image-receiving layer had a water absorption of 25 ml/m$^2$, as determined by the Bristow method at an absorption time of 5 seconds.

The test results are shown in Table 1.

Comparative Example 2

The same procedures as in Example 2 were carried out, with the following exceptions.

The neutral paper sheet for substrate sheet was produced by the same procedures as in Example 2 except that the wet paper sheet was dried to a moisture content of 4% by weight.

The reeled paper sheet had a basis weight of 64 g/m$^2$, a Bekk smoothness of felt side surface of 55 seconds, a Bekk smoothness of wire surface of 45 seconds, and a Stoechigt sizing degree of 5 seconds.

The paper sheet was coated with the same coating color paste as in Comparative Example 1.

The resultant ink-jet recording sheet was surface-smoothed by a super calender.

The Bekk smoothness of the ink image-receiving layer surface was 100 seconds and the Stoechigt sizing degree of the entire recording sheet was 8 seconds.

The test results are shown in Table 1.

Comparative Example 3

The same procedures as in Example 3 were carried out, with the following exceptions.

In the neutral paper sheet-producing procedures, the wet paper sheet was dried from a water-content of 75% by weight to 6% by weight by using a multi-cylinder type dryer.

The resultant dried paper sheet had a basis weight of 56 g/m$^2$, a Bekk smoothness of felt side surface of 35 seconds, a Bekk smoothness of the wire side surface of 28 seconds, and a Stoechigt sizing degree of 9 seconds.

Also, the paper sheet had elongations in water of 3.8% in the machine direction and 2.2% in the cross direction, and a ratio of the machine directional elongation to the cross directional elongation of 1.73:1.

The ink image-receiving layer was formed by the same coating color paste as in Comparative Example 1.

The test results are indicated in Table 1.

TABLE 1

| Example No. | Item | Brilliance of color image | Shape of dot | Ink-absorbing property | Water resistance | Storage durability | Resistance to curling and cockling |
|---|---|---|---|---|---|---|---|
| Example | 1 | 4 | 4 | 4 | 4 | 3 | 4 |
| | 2 | 4 | 4 | 4 | 4 | 3 | 4 |
| | 3 | 4 | 4 | 4 | 4 | 3 | 4 |
| Comparative Example | 1 | 2 | 2 | 3 | 1 | 2 | 1 |
| | 2 | 2 | 2 | 3 | 1 | 2 | 1 |
| | 3 | 2 | 2 | 3 | 1 | 2 | 1 |

We claim:

1. An aqueous ink-jet recording sheet comprising:

a substrate sheet consisting of a neutral paper sheet comprising, as a principal component, a cellulose pulp and having a pH of from 4 to 8 and a Stoechigt sizing degree of from 1 second to 15 seconds, and an aqueous ink image-receiving layer in an amount of 0.5 to 10 $g/m^2$, formed on a surface of the substrate sheet and comprising (a) fine silica particles having an oil absorption of 150 ml/100 g or more, and an average secondary particle size of from 1 to 10 $\mu m$, (b) a binder consisting of at least one member selected from the group consisting of polyvinyl alcohol resins and silanol-modified polyvinyl alcohol resins, and (c) a cationic polymeric material comprising at least one cationic, water-soluble acrylic copolymer having side chains each having at last two cationic radicals, said neutral paper sheet exhibiting, when a unit neutral paper sheet having a predetermined length or width is soaked in water and allowed to elongate without restriction, a ratio of the elongation in the machine direction thereof to the elongation in the cross direction thereof of 1.3 : 1 or less, and a standard deviation in the elongation of the unit sheet in the cross direction thereof, of 30% or less determined at a square unit area of 1 $cm^2$ of the unit sheet.

2. The recording sheet as claimed in claims 1, wherein the neutral paper sheet is conditioned by drying the neutral paper sheet to a moisture content of 6% by weight or less and then moistening the neutral paper sheet to an extent such that the increase in moisture content of the sheet is at least 1% by weight, under a tension.

3. The recording sheet as claimed in claim 1, wherein the acrylic copolymer has recurring units of the formula (I):

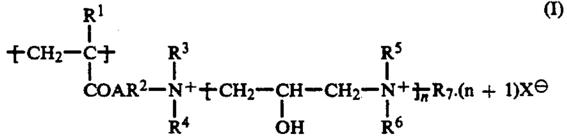

(I)

wherein $R^1$ represents a member selected from the group consisting of a hydrogen atom and a methyl radical; A represents a divalent radical selected from the group consisting of —O— and —HN—; $R^2$ represents a member selected from the group consisting of alkylene radicals having 2 to 4 carbon atoms, and the radical of the formula:

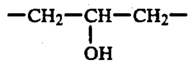

$R^3$, $R^4$, $R^5$ and $R^6$ respectively and independently from each other represent a member selected from alkyl radicals having 1 to 3 carbon atoms; $R^7$ represents a member selected from the group consisting of alkyl radicals having 1 to 18 carbon atoms and benzyl radical; and n represents an integer of 1 to 3.

* * * * *